United States Patent [19]

Preller et al.

[11] Patent Number: 5,082,304
[45] Date of Patent: Jan. 21, 1992

[54] TWENTY FOOT CONTAINER TRANSPORTER

[75] Inventors: Robert E. Preller, Mt. Holly, N.J.; Donald L. Miedama, Morrisville, Pa.

[73] Assignee: Sea-Land Service, Inc., Edison, N.Y.

[21] Appl. No.: 533,681

[22] Filed: Jun. 5, 1990

[51] Int. Cl.$^5$ .............................................. B60P 1/00
[52] U.S. Cl. ............................... 280/407.1; 280/149.2; 414/392
[58] Field of Search ................... 410/82; 414/399, 392; 280/407.1, 423.1, 901, 405.1, 149.2

[56] References Cited

U.S. PATENT DOCUMENTS

| | | | |
|---|---|---|---|
| 3,467,408 | 9/1969 | Regalia | 280/423.1 |
| 3,508,762 | 4/1970 | Pratt | 280/407.1 |
| 4,580,805 | 4/1986 | Bertolini | 280/407.1 |
| 4,836,735 | 6/1989 | Dennehy et al. | 280/149.2 |

Primary Examiner—Kenneth R. Rice
Assistant Examiner—Alan M. Kagen
Attorney, Agent, or Firm—Scully, Scott, Murphy & Presser

[57] ABSTRACT

A container transporting trailer comprising a forward, main and rear portion. The forward portion extends from the front of the trailer rearwardly and is adapted to hitch to, and thus clear, the fifth wheel of a tractor. At the end of the front portion opposite the front of the trailer, the forward portion turns downward and joins with the front of a main portion. The main portion extends rearwardly from the forward portion and has an upper surface plane for receiving and supporting a standardize container above the plane. The main portion is lower to the ground than the forward portion. Extending rearwardly from the end of the main portion. Extending rearwardly from the end of the main portion is a rear portion which ends at the end of the trailer. The rear portion has fixture for receiving a trailer bogie. The rear portion has an upper surface which lies parallel to and above the plane of the main surface. A segment of the rear portion adjacent the main portion is movable to facilitate the mounting and removal of a container on the main portion. The remaining non-adjacent segment of the rear portion is not movable.

31 Claims, 4 Drawing Sheets

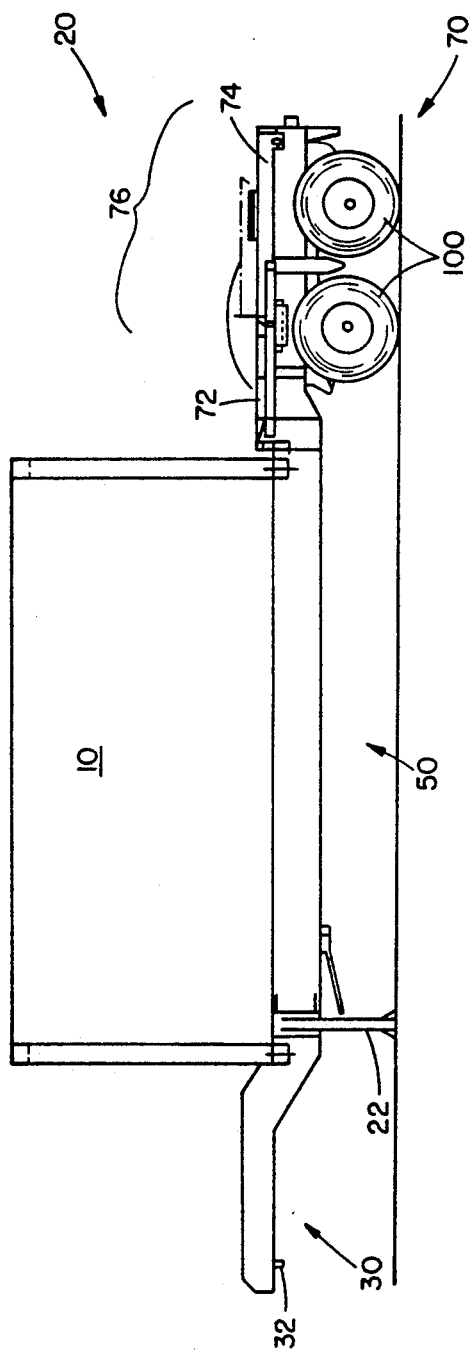
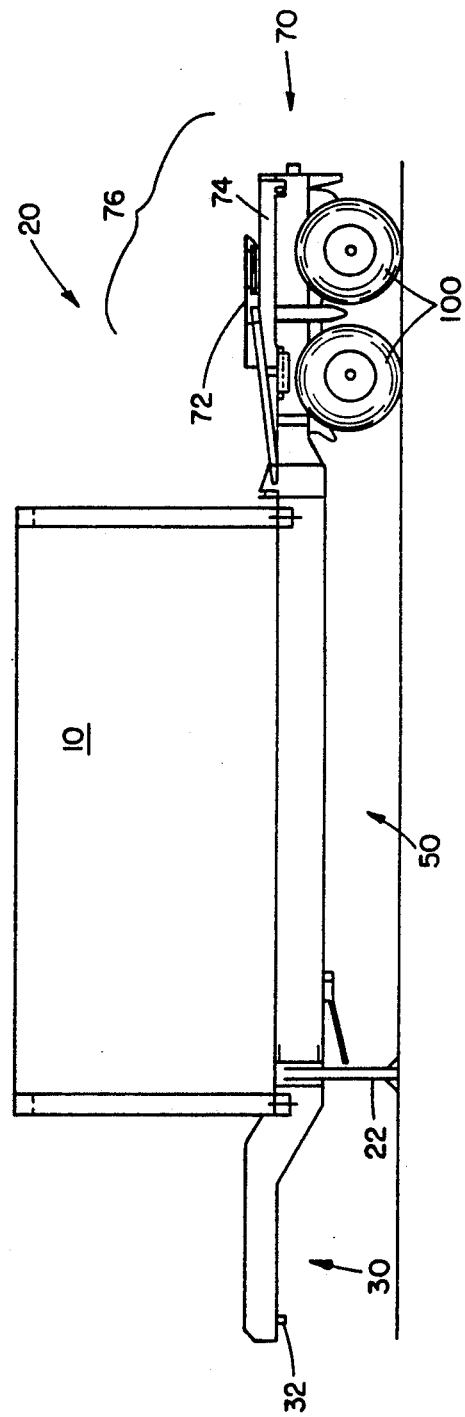

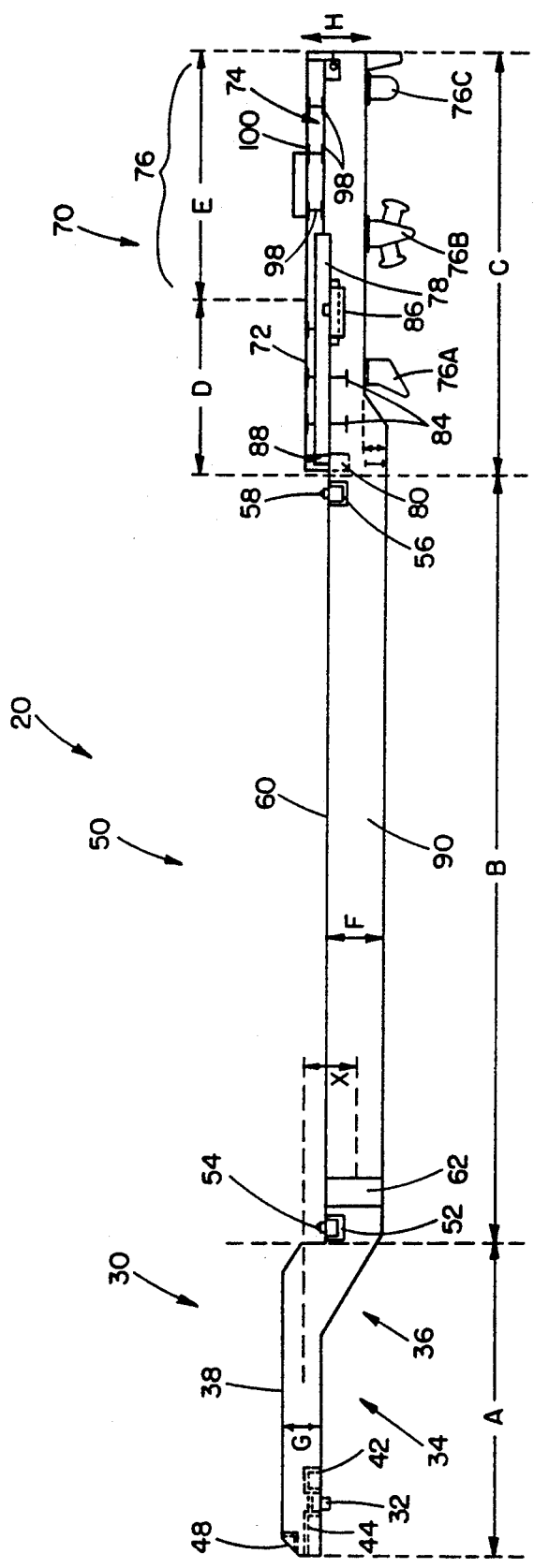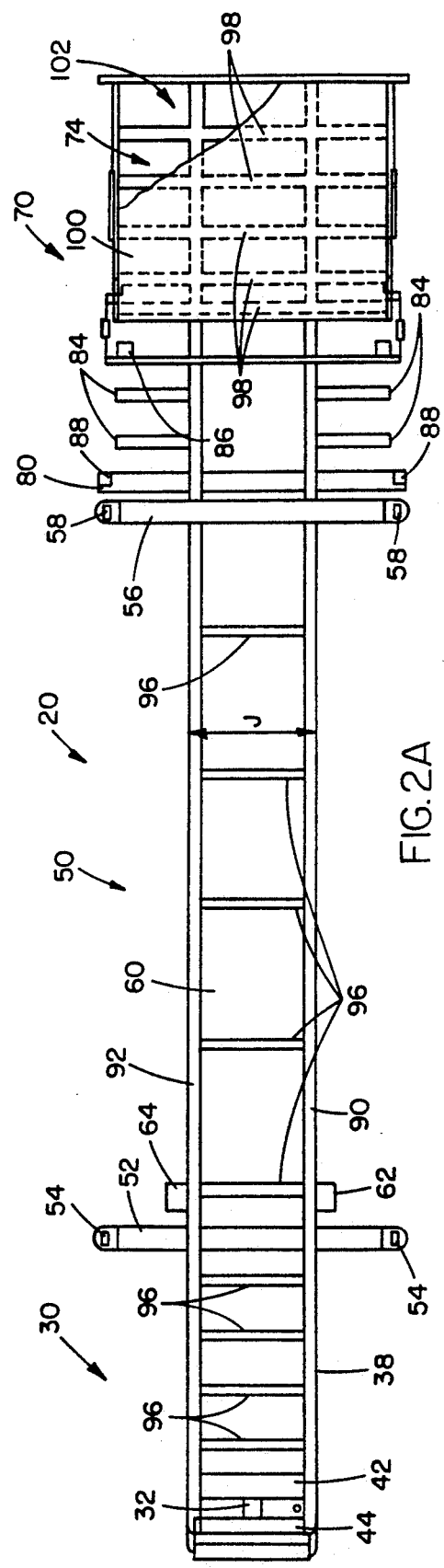

TWENTY FOOT CONTAINER TRANSPORTER

BACKGROUND OF THE INVENTION

Trailers for transporting standardized containers have numerous designs and have been adapted for many specific purposes in the prior art. U.S. Pat. No. 3,034,825 describes a typical trailer designed for container transport. As shown in that patent, the forward end of the trailer is raised relative to the rest of the trailer in a goose-neck design.

The goose-neck allows the trailer to clear the fifth wheel of the tractor while allowing the trailer to be lower to the ground for stability, and to allow, within regulatory overall height limits, high cube containers for maximum cubage (volume). However, as shown in the above-identified patent, the long standardized containers of 40' must lie on the raised portion as well as the lowered portion in order to meet highway length requirements. This requires a tunnel well in the forward part of the container so that it mounts on the trailer in a horizontal position.

Trailer designs for standardized 20' containers are likewise found in the prior art; however, the standardized 20' container has no tunnel well for accommodating a goose-neck portion of a trailer.

Trailers today which specifically receive 20' containers often have no goose-neck at all. The complete trailer bed is flat and lies at a level which clears the fifth wheel of the tractor. This trailer need only be slightly over 20' since the container rides on the portion of the trailer above the fifth wheel.

Heavily loaded 20' containers pose an additional problem. It is possible with certain cargo to load over 48,000 lbs. into a single 20' container. A load of this size, however, requires that the trailer bogie and the tractor bogie be separated lengthwise by more than the length of 20' feet in order to conform to applicable highway regulations. When conventional 40' flatbeds are used the center of gravity for the load is raised, and since flatbeds are significantly heavier than this skeletal container transporter (chassis) cargo weight is penalized.

This raised center of gravity can result in a relatively unstable container trailer. This is especially true when the container is heavily loaded. Furthermore, the level of the trailer bed required to clear a typical fifth wheel is above the nominal level of a loading dock and the floor of the container is elevated by approximately 6" from the floor of this flatbed trailer. Thus the trailer requires two loading ramps for loading or unloading the container, one for the flatbed, and one for the container. The ramps must necessarily angle upward, making loading and unloading difficult.

The prior art has also acknowledged the benefit of a goose-neck design to lower the center of gravity of the container even when the container does not ride over the forward portion but rather rests completely on the lowered portion. U.S. Pat. Nos. 3,587,890 and 2,772,892 are examples of such designs. The latter device also acknowledged the benefit of distributing the load rearwardly and is specifically designed for stabilizing the ride for heavy containers.

Finally, the prior art container trailers have a number of built-in, retractable loading ramps to facilitate loading and unloading of the trailer. Many of these devices in their operational position simply angle down from the rear of the trailer to the ground. These devices would also interfere with cargo stored on the trailer in their retracted position. U.S. Pat. Nos. 3,424,323 and 1,699,882 are examples of such devices.

The prior art therefore lacks a trailer specifically adapted for hauling a heavily loaded standardized 20' container which has a lowered center of gravity, has the weight of the container distributed over a relatively long trailer section and which has a platform designed to facilitate the loading and unloading of the container while being non-obtrusive when the container itself is being removed or mounted on the trailer bed.

SUMMARY OF THE PRESENT INVENTION

Consequently, an objective of the present invention is to provide a stable trailer for transporting a standardized 20' container.

It is a further objective to provide a 20' container trailer where the container's center of gravity is relatively low.

It is a further objective to provide a 20' container trailer where the load of the container is distributed over a relatively longer trailer.

It is a further objective to provide a 20' container trailer with a built-in level platform for easy loading and unloading of the container mounted thereon.

It is a further objective to provide a 20' container trailer with a platform for loading and unloading which does not interfere with the removal and mounting of the container on the trailer.

In accordance with the objectives enumerated above, the present invention is of a container transporting trailer comprising a forward, main and rear portion. The forward portion extends from the front of the trailer rearwardly and is adapted to hitch to, and thus clear, the fifth wheel of a tractor.

At the end of the front portion opposite the front of the trailer, the forward portion turns downward and joins with the front of a main portion. The main portion extends rearwardly from the forward portion and has an upper surface plane with a means for receiving and supporting a standardized container above the plane. The main portion is lower to the ground than the forward portion. Extending rearwardly from the end of the main portion is a rear portion which ends at the end of the trailer. The rear portion has fixtures for receiving a trailer bogie. The rear portion has an upper surface which lies parallel to and above the plane of the main surface. A segment of the rear portion adjacent the main portion is movable to facilitate the mounting and removal of a container on the main portion. The remaining non-adjacent segment of the rear portion is not movable.

In one embodiment of the present invention, the main portion extends approximately 20' and receives and supports a standard 20' container. The main portion is relatively lower to the ground than the front and rear portions, resulting in the container's center of gravity being lower to the ground, allowing carriage of high cube containers while staying within U.S. regulatory overall height limits. The rear portion extends such that the overall length of the trailer is approximately 39'. This results in the container load being distributed over a relatively long wheel base spread, providing a minimum of 36 feet between the forward drive axle of the tractor and the rear axle of the chassis. This spread allows each bogie to carry 34,000 pounds as permitted by U.S. Federal regulations on the interstate highway system.

In one embodiment of the present invention, the height of the upper surface of the rear portion where the wheel bogie is mounted is equal to approximately 54", the nominal height of a loading dock. Furthermore, the plane of the main portion lies below the upper surface of the rear portion by a distance equivalent to the depth of the floor of a 20' container. Consequently, when the trailer is backed against a loading dock, the dock, the upper surface of the rear portion and the container floor all lie in one plane. Thus, in moving cargo between the container and the loading dock, the dolly or hand truck need not be moved up and down an angled ramp.

Finally, in one embodiment of the present invention the movable part of the rear portion is slidably mounted to pivoting races and can be slid from its position adjacent the main portion rearwardly to a position atop the non-movable portion. The pivoting races restrain other types of movement of the movable segment. The purpose of this sliding portion of the ramp is to allow the container doors to be opened and closed while the container is on the chassis.

BRIEF DESCRIPTION OF THE DRAWINGS

FIG. 1 shows a trailer of the present invention with a 20' container mounted thereon with the rear portion in its normal configuration.

FIG. 1A shows the trailer of FIG. 1 with the rear portion in its stored configuration.

FIG. 2 is a detailed side view of the trailer of the present invention.

FIG. 2A is a top view of the trailer of FIG. 2 with a number of the trailer's features omitted for descriptive clarity.

DETAILED DESCRIPTION

Figure 3A:
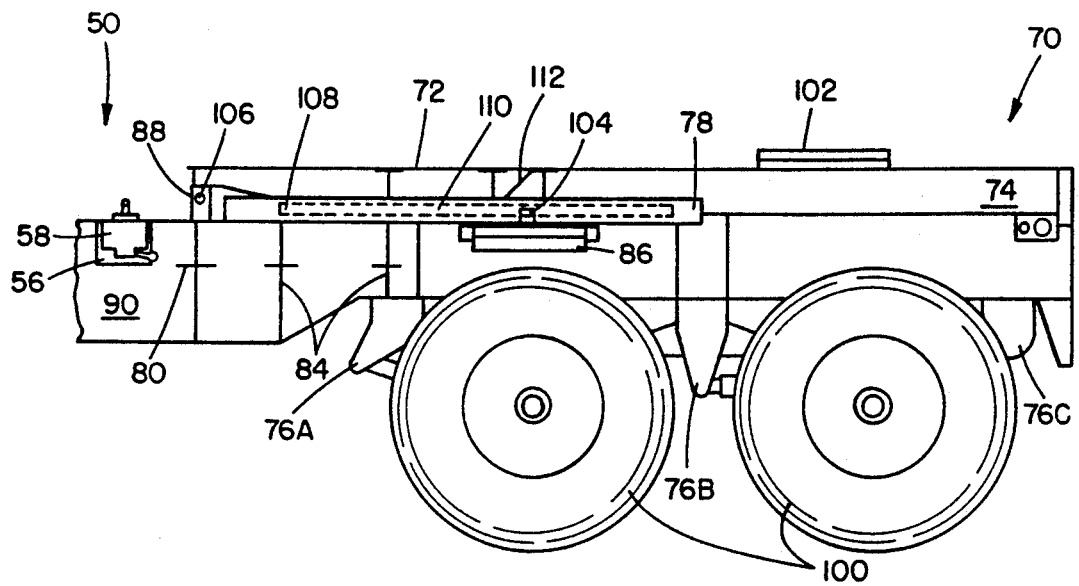
FIG. 3A is a side view of the rear portion of the trailer of the present invention in its normal configuration.

Referring to FIGS. 1 and 1A, where like reference numerals refer to like features, a container transporting trailer 20 is shown with a standard 20' container 10 mounted thereon. The front and rear of the trailer are referenced in the figures to facilitate the description of relative positions of features of the trailer.

The trailer 20 has a front portion 30, a main portion 50, and a rear portion 70.

The front portion 30 has a kingpin 32 protruding therefrom and attaches to the rear portion of a tractor, not shown in any of the figures.

The main portion 50 of the trailer 20 extends rearward from the forward portion 30. The main portion 50 is at a level beneath the forward portion 30. The container 10 is supported by the main portion 50.

The rear portion 70 of the trailer 20 extends rearward from the main portion 50. Mounted beneath the rear portion 70 and supporting the rear end of the trailer are wheels 100, attached to a bogie, concealed by the wheels 100 in the figures, the bogie being mounted to the underside of the rear portion 70.

The trailer 20, as shown in FIGS. 1 and 1A, is supported in a horizontal position at the forward end by landing gear 22 extending vertically from beneath the forward end of the main portion 50. The landing gear 22 is removed or retracted when the trailer 20 is hitched to a tractor.

As described in more detail below, and shown in FIG. 1, the rear portion 70 has an upper surface 76 which is at a level higher than the main portion 50. The upper surface 76 consists of a non-movable part 74 located toward the rear of the rear portion 70 and a movable segment 72 located toward the front of the rear portion 70. As shown in FIG. 1A and also described in more detail below, the movable segment 72 is movable to a position atop the non-movable part 74.

Referring to FIGS. 2 and 2A, the trailer 20 of the present invention is shown without the container loaded thereon, and with the wheels, bogie and landing gear from FIGS. 1 and 1A removed. In FIGS. 2 and 2A, like features are referenced with the same numeral and these features are equivalent to features similarly referenced in FIGS. 1 and 1A. FIG. 2 is a side view of the trailer 20 as in FIGS. 1 and 1A. FIG. 2A is a top view of FIG. 2 with one element, described below, omitted.

Referring to FIG. 2A, the trailer 20 is generally a frame-like structure of cross-members. Two main support beams 90, 92 extend the length of the trailer and are connected by a series of cross-beams 96 which extend across the length of the trailer 20. The distance outside to outside of the two main support beams, labelled J in FIG. 2A is 39¾". In FIG. 2, one cross-beam 90 is visible and is shown to have a varying profile.

The forward portion 30 of the trailer 20 is shown in FIGS. 2 and 2A.

In FIG. 2A, a kingpin 32 is shown secured in position by kingpin beam 42 and kingpin angle 44 which extends between main support beams 90, 92. Also extending between main support beams 90, 92 is front rail 48.

In FIG. 2, the kingpin 32 is shown and the projections of the beam 42 and angle 44 are shown through the main support beam 90. FIG. 2 also shows that the forward portion 30 has a horizontal primary section 34 and a downturned gooseneck rear section 36.

FIGS. 2 and 2A together show that the primary section 34 of the forward portion 30 has an upper horizontal plane 38 defined by the upper surface of the main support beams 90, 92.

The length of the forward portion 30, labelled A in FIGS. 2 and 2A, is approximately 96".

The main portion 50 of the trailer 20 is shown in FIGS. 2 and 2A connected at its forward end to the rear end of the forward portion 30, specifically the gooseneck downturned rear section 36 of the forward portion 30.

In FIG. 2A, there are two support beams 52, 56 shown at the forward and rear ends of the main section 50 and lying across main support beams 90, 92. Extending from each end of the support beams 52, 56 are twist lock assemblies 54, 58 which include engaging portions which are received in recesses in the four lower corners of a standard 20' container. Twist lock assemblies are old in the intermodal container transporting art and serve to position and intermodal container on the trailer and secure it against horizontal and vertical motion with respect to the trailer.

Also shown in FIG. 2A are landing gear mounting fixtures 62, 64 into which the removable landing gear, not shown, is secured. A horizontal plane 60 is furthermore defined by the upper surfaces of the main support beams 90, 92 of the main portion 50.

Referring to FIG. 2, the upper surfaces of support beams 52, 56 lie in the horizontal plane 60. The engaging portions of twist locks 54, 58 lie above plane 60.

Landing gear mounting fixture 62 is shown to extend vertically the width of the main portion 50. The width of the main portion 50, labelled F in FIG. 2, is approximately 18".

Due to the downturned rear section 36 of the forward portion 30, the plane 60 of the main portion 50 lies below the upper horizontal plane 38 of the forward portion 30.

The length of the main portion 50, labelled B in FIGS. 2 and 2A, is approximately 240" or 20'. The main portion is shown to include approximately the space on the trailer occupied by the 20' container. The distance of separation between the engaging portions of twist locks 54, 58 along the length of the trailer 20 and across each support member 52, 56 is set by the corresponding recesses found in the bottom of a standard 20' container and is approximately 230.5" and 89" respectively.

The downturned gooseneck rear section 36 of the forward portion 30 enables the horizontal plane 60 to lie lower than the upper horizontal plane 38 of the forward portion 38 and, consequently, a container mounted on the main portion 50 rides with its center of gravity lower than if the plane 60 was coextensive with the higher plane 38. The downturned rear section 36 furthermore allows the main section 34 of the forward portion 30 to lie above and clear the fifth wheel of a tractor when the trailer 20 is mounted on a tractor with kingpin 32 while simultaneously allowing the floor of the container to be positioned at standard loading dock height. The difference between the mean height of the forward portion 30 and the mean height of the main portion 50, shown in FIG. 2 as X, is approximately 15".

The rear portion 70 of the trailer 20 is shown in FIGS. 2 and 2A.

In FIG. 2, a movable segment 72 of the rear portion 70 and a pivotable mount 78 is shown described more particularly below in the description of FIGS. 3A, 3B, 4A, and 4B. The movable segment 72 and pivotable mount 78 are omitted from FIG. 2A to facilitate the description of other features.

Referring to FIG. 2A, pivot support beam 80 is located toward the front of rear portion 70, and extends transverse to main support beams 90, 92. Located at each end of the pivot support beam 80 are pivot point fixtures 88. A pair of supplementary support beams 84 also extend transverse to each main support beams 90, 92 without spanning the region between the main support beams 90, 92. The supplementary support beams 84 are located toward the rear of the rear portion 70 with respect to the pivot support beam 88. Further toward the rear of the rear portion 70 is an outrigger support assembly 86 extending transverse to and across main support beams 90, 92.

As shown in FIG. 2, the upper surfaces of pivot support beam 80 and supplementary support beams 84 are coplanar with the plane 60 of the main portion 50 and support movable portion 72 when located thereon.

As further shown in FIG. 2, an elevated non-removable part 74 is located to the rear of the rear portion 70 and extends partially above the outrigger support assembly 86. As illustrated to FIG. 2A, the non-movable part 74 has a rectangular surface 100 which extends across, as well as along, main support beams 90, 92. A segment 102 of surface 100 is shown cut away, revealing a series of supporting cross members 98 inside rear portion 74. The outline of the members 98 are shown in broken lines where the surface 100 is not cut away.

Referring again to FIG. 2, the outlines of the ends of the cross members 98 are shown in broken lines on the side surface of non-movable portion 74.

Further shown in FIG. 2 are front, equalizer and rear hangers 76A, 76B, 76C, respectively, to which a wheel bogie is attached to the trailer 20.

As seen in FIG. 2, the width of the main support beam 90 is reduced at the lower surface by a distance labelled I prior to the front hanger 76A. The same reduction occurs in main support 92, not visible in FIG. 2. The distance I is approximately 6". The length of the rear portion 70, labelled C is approximately 132".

Figure 3B:
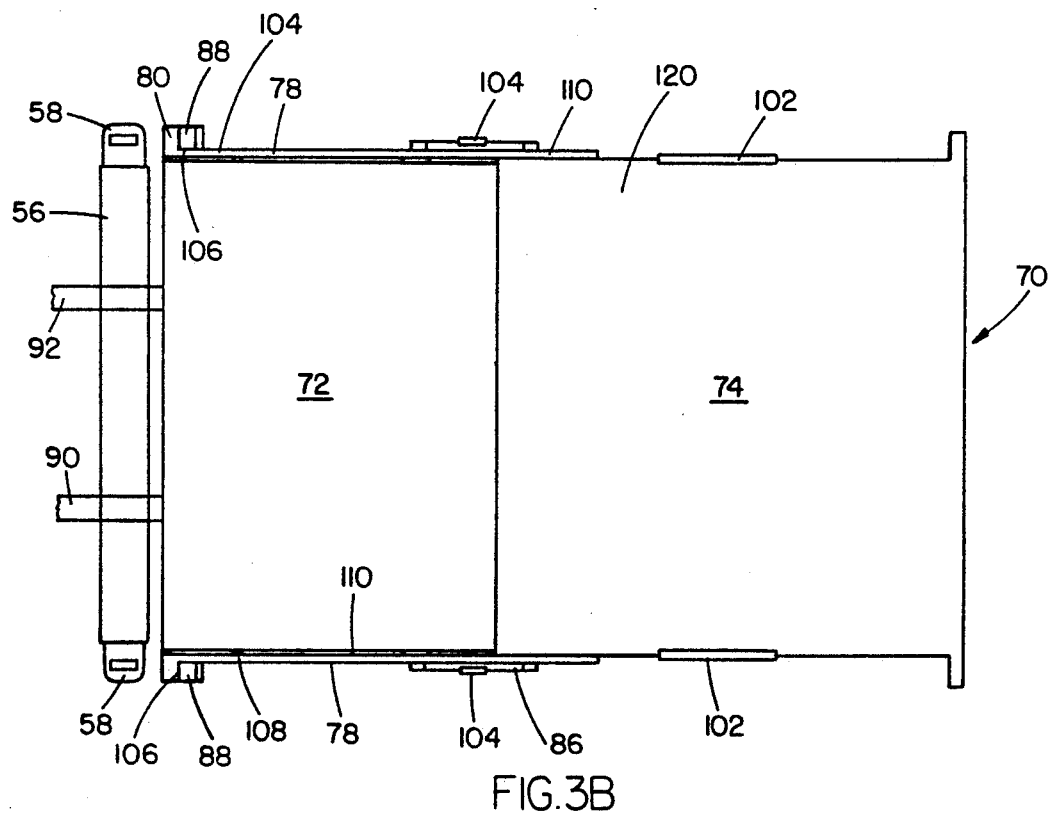
FIG. 3B is a top view of the rear portion shown in FIG. 3A.

FIGS. 3A, 3B, 4A, and 4B show a more detailed side and top view of the rear portion 70 of the trailer 20 of the prior figures. In FIGS. 3A and 3B, the wheels 100 are shown mounted through a bogie, not shown in FIGS. 3A and 3B, to hangers 76A, 76B, 76C.

Also shown in FIGS. 3A, 3B, 4A, and 4B and described above with respect to FIGS. 2 and 2A are main support beams 90, 92, support beam 56, twist lock assemblies 58, pivot support beam 80, pivot point fixtures 88, supplementary support beams 84, outrigger support assembly 86, and non-movable part 74. The movable part 72 and related features, mentioned above with respect to FIG. 2 which were not described there, are shown in FIGS. 3A, 3B, 4A, and 4B are now described in detail.

FIGS. 3A and 3B illustrate the top and side views of rear portion 70, with movable segment 72 shown in its normal position. The upper surface of movable segment 72 lies in a plane 100 with the upper surface of non-movable part 74. As seen most clearly in FIG. 3B, the width of the movable segment 72 across the main support beams 90, 92 is approximately equal to the width of the non-movable part 74. The plane 100 formed by the movable segment 72 and the non-movable part 74 forms a platform for loading and unloading a container from or to a loading dock adjacent the rear of the truck.

The vertical depth of the movable and non-movable portions 72, 74 is equal to the nominal vertical depth of the floor of a 20' standard container. Therefore, from FIG. 3A, plane 120 will be substantially co-extensive with the floor of a container loaded on main portion 50. Loading and unloading a container on main portion 50 is facilitated since the container floor, plane 120 and a loading dock against which the trailer is backed all lie in one plane.

A dolly or hand truck may therefore be wheeled in one plane between the container and the loading dock.

In FIGS. 3A and 3B, pivot arms 78 are located on opposite sides of movable segment 72 and pivotably secured to pivot point fixtures 88 at pivot points 106. Mounting pins 104, 108 are secured to movable segment 72 and interface with grooves 110, shown in FIGS. 3A and 3B in dashed lines, in pivot arms 78.

Figure 4A:
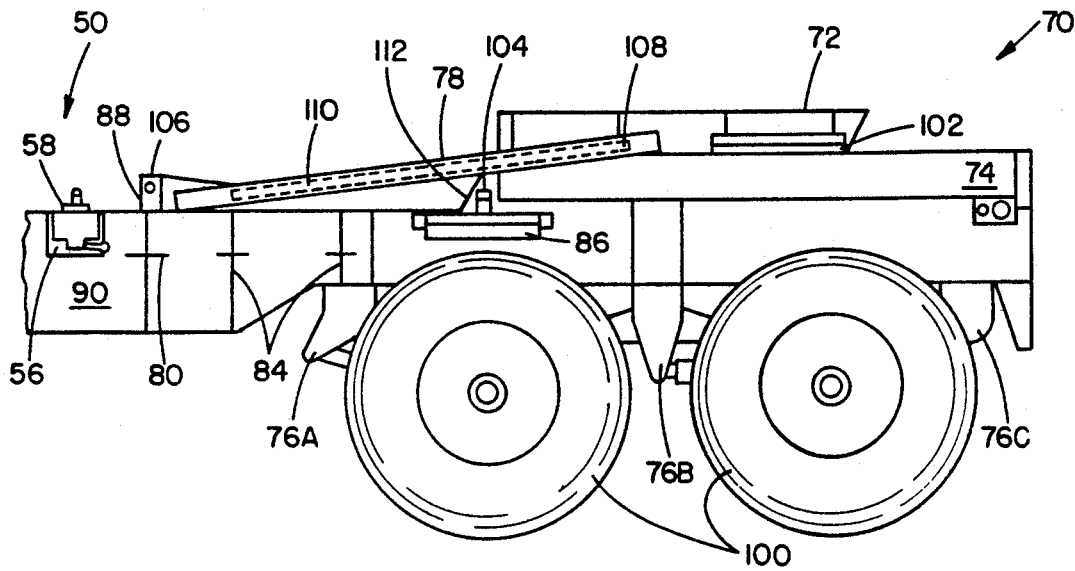
FIG. 4A is a side view of the rear portion of the trailer of the present invention in its stored configuration.
Figure 4B:
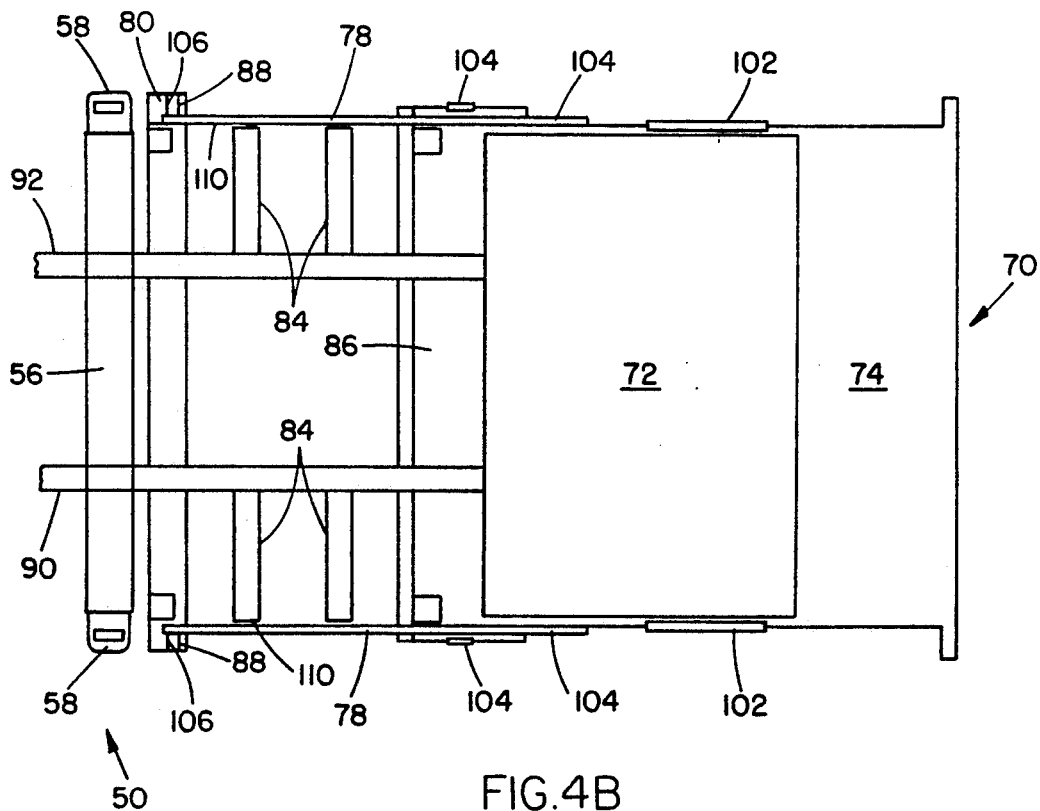
FIG. 4B is a top view of the rear portion shown in FIG. 4A.

Referring to FIGS. 4A and 4B the trailer is shown with the movable segment 72 in its temporary position atop the non-movable part 74. The pivot arms 78 are shown most clearly in FIG. 4A to be pivoted around pivot points 106. Mounting pins 108 are located at the rear end of grooves 110 thereby preventing further rearward movement of movable segment 72. Gathering plates 102, extending vertically from the non-movable part 74 on each side of the movable segment 72 prevent any horizontal movement of the movable segment 72 across the length of the trailer.

Comparing FIGS. 3A and 3B with FIGS. 4A and 4B, in moving the movable segment 72 from its normal position to the stored position, the movable segment 72 is slid backwards over the forward edge 112 of non-movable part 74. as the movable segment 72 is slid backwards, the mounting pins 108 slide toward the rear of grooves 110, causing pivot arms 78 to pivot about pivot points 106. When the movable segment 72 is resting completely atop non-movable part 74, mounting pins 108 are at the rear end of grooves 110, as in FIGS. 4A and 4B.

While the preferred embodiment utilizes a movable and sliding segment 72, it should be noted that a removable segment could also be used as segment 72, and the phase movable segment is intended to include both movable and removable segments.

The above description is intended to convey the inventor's present understanding of the best mode of practicing the invention. It is therefore not intended to limit the invention in any manner.

We claim:

1. An intermodal container transporting trailer comprising:
   (a) a forward portion extending from the front of the trailer rearward, the forward portion having a hitch means for hitching the trailer to a tractor having a fifth wheel, the forward portion adapted to clear the fifth wheel of the tractor when the trailer is hitched to the tractor, the forward portion turning downward at the end opposite the front of the trailer;
   (b) a main portion connected to the end of the downturned end of the forward portion, the main portion extending rearward from the forward portion, the main portion having an upper surface plane, the main portion including means for receiving and supporting an intermodal container above the upper surface plane, the main portion being lower than the forward portion;
   (c) a rear portion connected to the end of the main portion opposite the forward portion, the rear portion extending rearwardly from the main portion and ending at the end of the trailer, the rear portion having fixtures for receiving a trailer bogie;
   (d) the rear portion having an upper surface, the upper surface of the rear portion lying in a plane parallel to and above the upper surface plane of the main portion, a segment of the rear portion adjacent the main portion being movable between a first position, in which said segment and the remaining part of the rear portion define a substantially coextensive and substantially continuous planar upper surface of the rear portion to enable cargo to be moved thereover while loading and unloading an intermodal container, and a second position, and also to facilitate reception of a container by the main portion, with said remaining part of the rear portion being non-movable.

2. An intermodal container transporting trailer as in claim 1 wherein the upper surface plane of the main portion has a means for receiving and supporting a 20' container.

3. An intermodal container transporting trailer as in claim 2 wherein the upper surface of the rear portion is at a height of approximately 54", the nominal height of a loading dock.

4. An intermodal container transporting trailer as in claim 3 wherein the upper surface plane of the main portion lies below the upper surface of the rear portion by a distance equal to the height of the floor of the 20' container.

5. An intermodal container transporting trailer as in claim 4 wherein the movable segment of the rear portion has a width equal to the width of the floor of the 20' container.

6. An intermodal container transporting trailer as in claim 5 wherein the movable segment is slidably mounted to the rear portion so that it is movable between said first position adjacent the main portion and a position atop the second the upper surface of the non-movable part of the rear portion.

7. An intermodal container transporting trailer as in claim 6 wherein the forward, main and rear portions of the trailer include frames made of at least two main support beams extending horizontally in the direction between the front and rear ends of the trailer, and a series of cross beams extending horizontally between the at least two main support beams.

8. An intermodal container transporting trailer as in claim 7 wherein two main support beams extend horizontally from the front of the trailer to the rear of the trailer, the two main support beams having segments which correspond to the main support beams of the forward, main and rear portions of the trailer.

9. An intermodal container transporting trailer as in claim 8 wherein the plane of the main portion is defined by upper surfaces of the two main support beams.

10. An intermodal container transporting trailer as in claim 9 wherein the means for receiving and supporting the 20' container, which has a 20' length and four bottom corners, is two or more supporting cross beams which lie in the upper surface plane of the main portion defined by the surfaces of the two main support beams and perpendicular to the length of the trailer.

11. An intermodal container transporting trailer as in claim 10 wherein the intermodal container includes end frames and corner castings, and said supporting cross beams are spaced such that they lie beneath the end frames and corner castings of the container.

12. An intermodal container transporting trailer as in claim 11 wherein there are two supporting cross beams separated by approximately the length of a 20' container, the length of separation being approximately 19' 10½", such that the main portion's supporting cross beams lie beneath the container's structural cross members at edges extending along the length of a 20' intermodal container.

13. An intermodal container transporting trailer as in claim 12 wherein the supporting cross beams have one or more twist locks which are received in and engage recesses of an equal number of corner castings in the container.

14. An intermodal container transporting trailer as in claim 13 wherein the one or more twist locks which engage the recesses of the container prevent vertical and horizontal motion of the container with respect to the trailer, and wherein two twist locks are located at opposite ends of each supporting cross beam, the corresponding corner castings being located at the four bottom corners of the 20' container.

15. An intermodal container transporting trailer as in claim 14 wherein the movable segment of the rear portion is slidably mounted to the trailer by a pair of races pivotably mounted to a cross member at the forward end of the rear portion on opposite sides of the movable segment, the movable segment engaging the races.

16. An intermodal container transporting trailer as in claim 15 wherein each race contains a groove extending parallel to the length of the trailer, the movable segment contains a pair of pins, one extending from each side of the segment and engaging the grooves of the pivotable race such that as the movable segment is moved from its position adjacent the main portion to atop the non-movable part, the pins move within the grooves and cause the races to pivot such that they are angled upward from the pivot point.

17. An intermodal container transporting trailer as in claim 16 wherein the groove in each race ends at a point before the end of the race such that when the movable segment is positioned atop the non-movable part, it is prevented from further rearward motion by the pin contacting the end of the groove in each race.

18. The intermodal container transporting trailer as in claim 17 wherein the segments of the two main support beams which correspond to the forward portion to the front of the downturned end have a vertical depth of approximately 12¼".

19. The intermodal container transporting trailer as in claim 18 wherein the vertical depth of the segments of the two main support beams which correspond to the main portion is approximately 18".

20. The intermodal container transporting trailer as in claim 19 wherein the upper surface plane of the main portion lies approximately 12" below the plane defined by the upper horizontal surfaces of the two main support beams which correspond to the forward portion to the front of the downturned end.

21. The intermodal container transporting trailer as in claim 20 wherein the vertical depth of the segments of the two main support beams which correspond to the non-movable remaining part of the rear portion is approximately 18".

22. The intermodal container transporting trailer as in claim 21 wherein the vertical depth of the segments of the two main support beams which lie beneath the movable segment of the rear portion varies from approximately 18" to approximately 11.75".

23. The intermodal container transporting trailer as in claim 22 wherein the upper surface plane of the main portion lies approximately 6½" below the plane defined by the upper surfaces of the non-movable part of the rear portion.

24. The intermodal container transporting trailer as in claim 23 wherein the two main support beams are separated by a distance of approximately 39¾" (outside to outside) along the length of the trailer.

25. The intermodal container transporting trailer as in claim 24 wherein the two supporting cross beams of the main portion extend approximately 89" between the two twist locks.

26. The intermodal container transporting trailer as in claim 25 wherein the length of the forward portion is approximately 100".

27. The intermodal container transporting trailer as in claim 26 wherein the length of the main portion is approximately 240".

28. The intermodal container transporting trailer as in claim 27 wherein the length of the rear portion is approximately 132".

29. The intermodal container transporting trailer as in claim 28 wherein the length of the movable segment is approximately 55" and the length of the non-movable part is approximately 77".

30. The intermodal container transporting trailer as in claim 29 wherein one of the supporting cross beams of the main portion is located approximately 101" from the front end of the trailer and the other supporting cross beam is located approximately 331" from the front end of the trailer.

31. An intermodal container transporting trailer as in claim 1, wherein when said movable segment is in said second position, and an intermodal container having rear doors is positioned on said main portion, the movable segment in said second position provides clearance to allow the rear doors of the container to be opened and closed.

* * * * *

UNITED STATES PATENT AND TRADEMARK OFFICE
CERTIFICATE OF CORRECTION

PATENT NO. : 5,082,304

DATED : January 21, 1992

INVENTOR(S) : Robert E. Preller, et al.

It is certified that error appears in the above-identified patent and that said Letters Patent is hereby corrected as shown below:

ON THE TITLE PAGE

In the Abstract, line 12: delete "Extending rearwardly from the end of the main portion."

In the Abstract, line 15: "fixture" should read --fixtures--

Column 8, line 13, Claim 6: delete "a" and insert --the second--

Column 8, line 14, Claim 6: after "atop" delete --the second--

Signed and Sealed this

Eighth Day of June, 1993

Attest:

MICHAEL K. KIRK

Attesting Officer

Acting Commissioner of Patents and Trademarks